May 1, 1956 — D. W. HAMM — 2,743,973
SPACER AND EXPANDER RING
Filed April 28, 1953
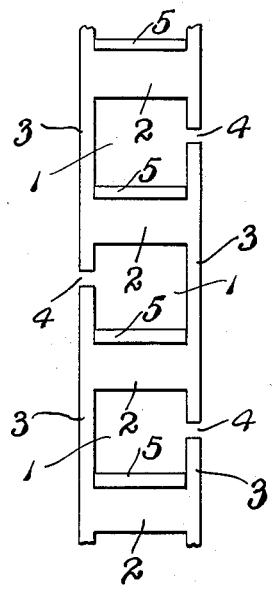
FIG. 2.
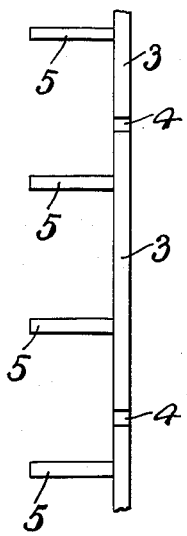
FIG. 3.
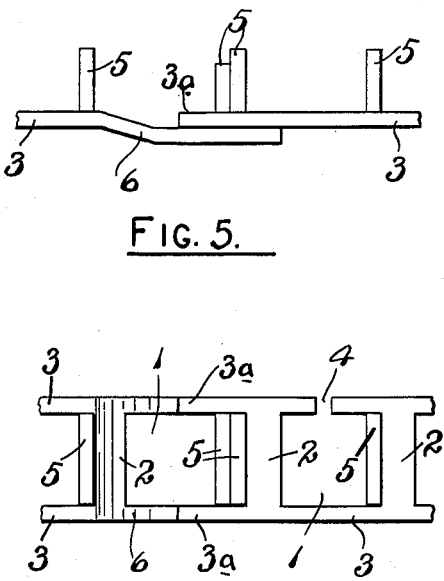
FIG. 5.
FIG. 6.
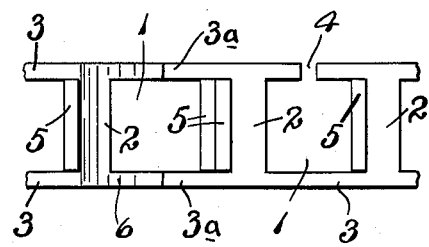
FIG. 4.
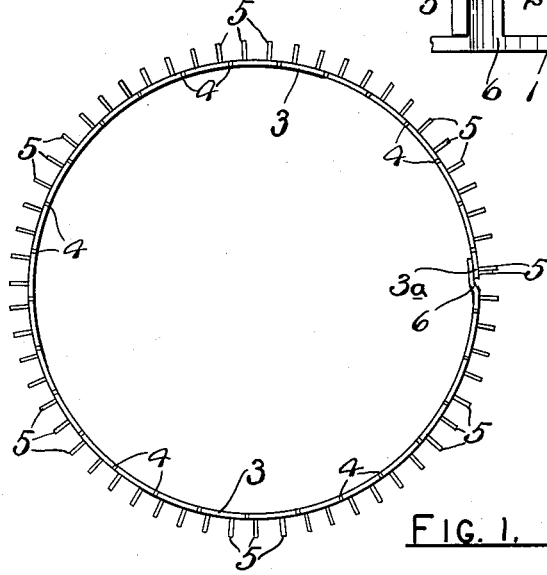
FIG. 1.
INVENTOR.
DOUGLAS W. HAMM
BY
Frank E. Liverance Jr.
ATTORNEY › # United States Patent Office 2,743,973
Patented May 1, 1956

2,743,973

SPACER AND EXPANDER RING

Douglas W. Hamm, Muskegon, Mich., assignor to Muskegon Piston Ring Company, Muskegon, Mich., a corporation of Michigan Application April 28, 1953, Serial No. 351,555

1 Claim. (Cl. 309—45)

This invention relates to a spacer and expander ring element for piston rings.

It is an object and purpose of the present invention to provide a novel and very effective spacer and expander ring, to be used between upper and lower substantially flat steel rails which, in practice, may have a thickness of approximately .020" or .025", the expander and spacer which I have invented serving to hold and support the rails in spaced relation and, through the resistance of the spacer and expander to circumferential contraction, force said rails outwardly to cause their outer edges to bear with suitable pressure against the wall of a cylinder in an internal combustion engine in which installed.

The present invention is directed to a novel structure of expander and spaced element of the piston ring, which is completed by upper and lower steel rails, which is economical to produce, and has large vent openings therethrough for the passage of oil salvaged from the walls of a cylinder through the expander and spacer into the ring groove which receives the piston ring, and from which it is drained through suitable passages to the interior of the piston. Such combined expander and spacer eliminates separate or individual spring expanders which have been used to a large extent and which, for their use, required that the piston ring grooves have bottoms against which the separate expanders engaged. With the present invention, no bottom for the piston ring groove is required and such expander and spacer may be used in so-called bottomless piston ring grooves, as well as those which have bottoms. This invention also permits satisfactory application of the ring in grooves which have insufficient side support, particularly on the bottom side of the groove. The design incorporated in the invention prevents the ring from dropping down and, consequently, threading through the piston, eventually falling into the crankcase.

An understanding of the invention, and a preferred embodiment thereof, may be had from the following description, taken in connection with the accompanying drawing, in which:

Fig. 1 is a plan view of the ring expander and spacer member of my invention.

Fig. 2 is a fragmentary enlarged side elevation of the ring.

Fig. 3 is an edge view thereof, looking at Fig. 2 from the right.

Fig. 4 is a side elevation of the spacer and expander at the parting therein with the parting open.

Fig. 5 is an edge view of said expander and spacer at the parting with the parting closed, and Fig. 6 is a side elevation of the expander and spacer at the parting, with the parting closed as it is in use.

Like reference characters refer to like parts in the different figures of the drawing.

The expander and spacer ring member of my invention is made from a length of steel ribbon stock, or other satisfactory material, preferably of the proper width which will be slightly less than the axial dimension of a piston ring groove into which it is placed when used. A plurality of rectangular openings 1 are cut in succession from the thin ribbon stock, leaving between successive openings 1 cross sections 2 which connect narrow side edge sections 3. Alternately at opposite side edges of the expander and spacer ring member, the sections 3 are transversely cut, providing slots 4. Such slot 4 is not necessary in every alternate section but enough are provided to effect the circumferential compression needed. The width of sections 3 will vary, depending on whether they are to have a slot 4 or not. Those sections 3 which have a slot 4 will be substantially the same width as the thickness of the steel rails which are used in conjunction with the expander. Those sections 3 which do not have the cut 4, will be wider, depending on the tension desired in the ring and depending on the necessary strength required in the ring. Accordingly, the rail contact with the tongues will be such that a given rail will be supported by every other tongue. The metal from the ribbon stock which is cut therefrom to provide the openings 1 is struck outwardly at one edge of each of said openings 1, making a succession of radial, outwardly extending, rectangular tongues 5, the opposite side edges of which are inset from the edges of the expander and spacer a distance equal to the width of the sections 3.

Such sections 3 will be of substantially the same width as the thickness of the steel rails which are used when the piston ring is completed and is used in the groove of an engine piston. The expander and spacer is of a generally circular form and is parted at one side. The steel rails which are used are also of circular form, parted at one side and one will be located below the tongues 5 and the other thereabove, such rails at their inner edges coming against the sections 3.

At the parting at one end of the element described, a short portion thereof is offset by bending at an angle as indicated at 6 so that the end portion of such end of the spacer and expander will come within the opposite end portion thereof as shown in Fig. 5. At the parting, at such offset portion, the cross section 2 connecting the side sections 3 passes underneath or inside the free end portions 3a (Fig. 4) of the end side sections 3 at the opposite end of the expander and spacer at its parting, whereupon the two outwardly extending tongues 5 adjacent the ends of the spacer and expander at its parting come against each other. As shown in Figs. 5 and 6, such engagement provides a firm abutment so that the expander and spacer may be circumferentially contracted and compressed, yielding and being reduced in diameter, the slots 4 being narrowed.

When a spacer and expander made in accordance with my invention has the upper and lower steel rails as described assembled with it and is put in a ring groove of a piston, the normal exterior diameter of a cylinder within which the piston is installed is less than the diameter of such spacer and expander with assembled rails. The expander is circumferentially compressed and contracted and the installation within an engine cylinder is accomplished with the expander and spacer contracted and reduced in diameter. This places the spacer and expander member under tension and with the generation of force therein tending to cause the expander to resume its original greater diameter. Such force is transmitted to the steel rails of the ring, to force them outwardly to bear, with the proper unit pressure, against the cylinder wall.

The structure described is of a simple nature, quickly and readily manufactured, the abutment produced at the joint is one which will not become disengaged as it is interlocked against any movement which would permit lateral separation, and cannot open at the joint because the ring is under contracting pressure. The openings 1 provide large vent passage for oil which is salvaged in an internal combustion engine and directed into the piston ring groove in which the expander and spacer is located, being drained therefrom into the piston in the usual and well known manner.

The invention is defined in the appended claim and is to be considered comprehensive of all forms of structure coming within its scope.

I claim:

An expander and spacer for piston rings comprising, a parted, generally circular band of thin ribbon, metallic stock having, lengthwise thereof, a successive series of openings with transverse sections between successive openings, and a tongue extending radially outward from one end of each opening integral with an adjacent transverse section, and longitudinal sections of a preselected substantially narrow width integrally connecting said transverse sections at the ends thereof, connecting sections at each side of said expander and spacer having a transverse slot therethrough, said slots being staggered at opposite side edges of said expander and spacer, said expander and spacer at its ends at the parting thereof having cooperating tongues in side by side pressure engagement, and means at said parting for holding said tongues from lateral movement with respect to each other.

References Cited in the file of this patent
UNITED STATES PATENTS
2,345,176    Bowers ---------------- Mar. 28, 1944